United States Patent
Schuster et al.

(10) Patent No.: US 7,550,023 B2
(45) Date of Patent: Jun. 23, 2009

(54) MULTI FUNCTIONAL FILTER

(75) Inventors: Hans-Michael Schuster, Haan (DE);
Klaus Eimer, Ratingen (DE); Dieter Patzig, Ratingen (DE)

(73) Assignee: Ultrafilter International AG, Haan (DE)

( * ) Notice: Subject to any disclaimer, the term of this patent is extended or adjusted under 35 U.S.C. 154(b) by 290 days.

(21) Appl. No.: 10/548,238

(22) PCT Filed: Mar. 4, 2004

(86) PCT No.: PCT/EP2004/002230

§ 371 (c)(1),
(2), (4) Date: Aug. 11, 2006

(87) PCT Pub. No.: WO2004/091751

PCT Pub. Date: Oct. 28, 2004

(65) Prior Publication Data

US 2007/0084785 A1    Apr. 19, 2007

(30) Foreign Application Priority Data

Mar. 5, 2003  (DE)  ................. 103 09 428

(51) Int. Cl.
*B01D 46/00* (2006.01)
(52) U.S. Cl. .................. 55/498; 55/502; 210/443
(58) Field of Classification Search ............. 55/498, 55/502, 503, 504, 505; 210/443, 444, 445, 210/450
See application file for complete search history.

(56) References Cited

U.S. PATENT DOCUMENTS

| | | | | |
|---|---|---|---|---|
| 2,096,841 A | * | 10/1937 | Fricke | ................. 96/132 |
| 3,901,262 A | * | 8/1975 | Gutkowski | ............ 137/101.11 |
| 4,614,204 A | | 9/1986 | Dolejs | |
| 4,764,275 A | * | 8/1988 | Robichaud | ................. 210/232 |
| 5,685,985 A | * | 11/1997 | Brown et al. | ............... 210/450 |
| 5,928,513 A | * | 7/1999 | Bradford | ................... 210/443 |
| 2004/0182777 A1 | * | 9/2004 | Stankowski et al. | ......... 210/455 |
| 2006/0175246 A1 | * | 8/2006 | Komine | ...................... 210/444 |

FOREIGN PATENT DOCUMENTS

| | | |
|---|---|---|
| DE | 100 52 524 | 4/2002 |
| EP | 0 808 206 | 10/1998 |
| WO | WO 96/24426 A | 8/1996 |
| WO | WO 98/45641 | 10/1998 |

\* cited by examiner

*Primary Examiner*—Duane Smith
*Assistant Examiner*—Robert A Clemente
(74) *Attorney, Agent, or Firm*—Henry M. Feiereisen; Ursula B. Day

(57) ABSTRACT

In a filter, a rotatable connection flange with two kidney-shaped openings and a diametral web between the openings is located between the top part and bottom part of the filter. Rotating the connection flange allows the direction in which a gas flows through the filter element located in the filter housing to be reversed. In this way, the filter can be operated as a coalescence filter or as a dust filter by simply rotating the connection flange.

36 Claims, 9 Drawing Sheets

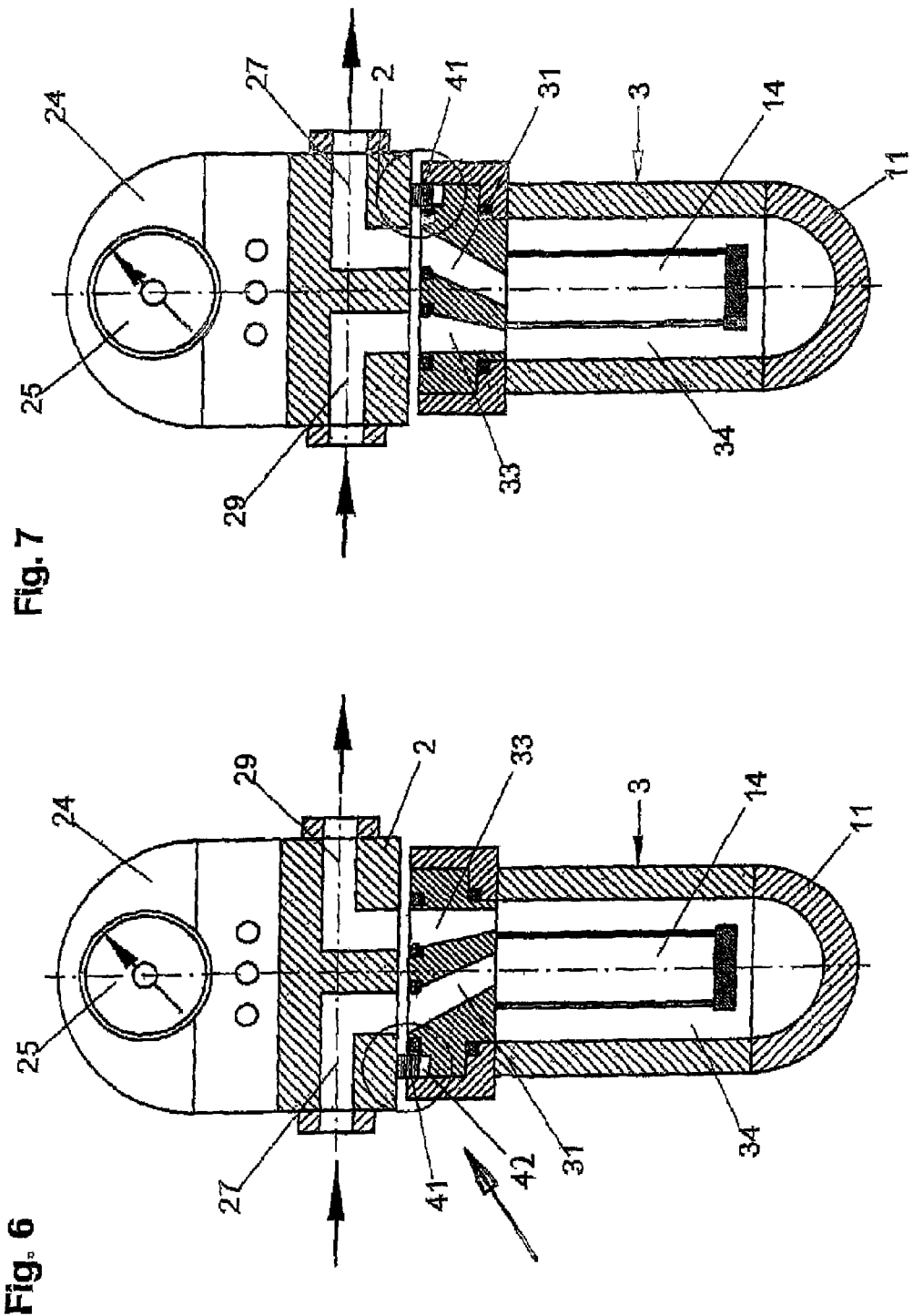

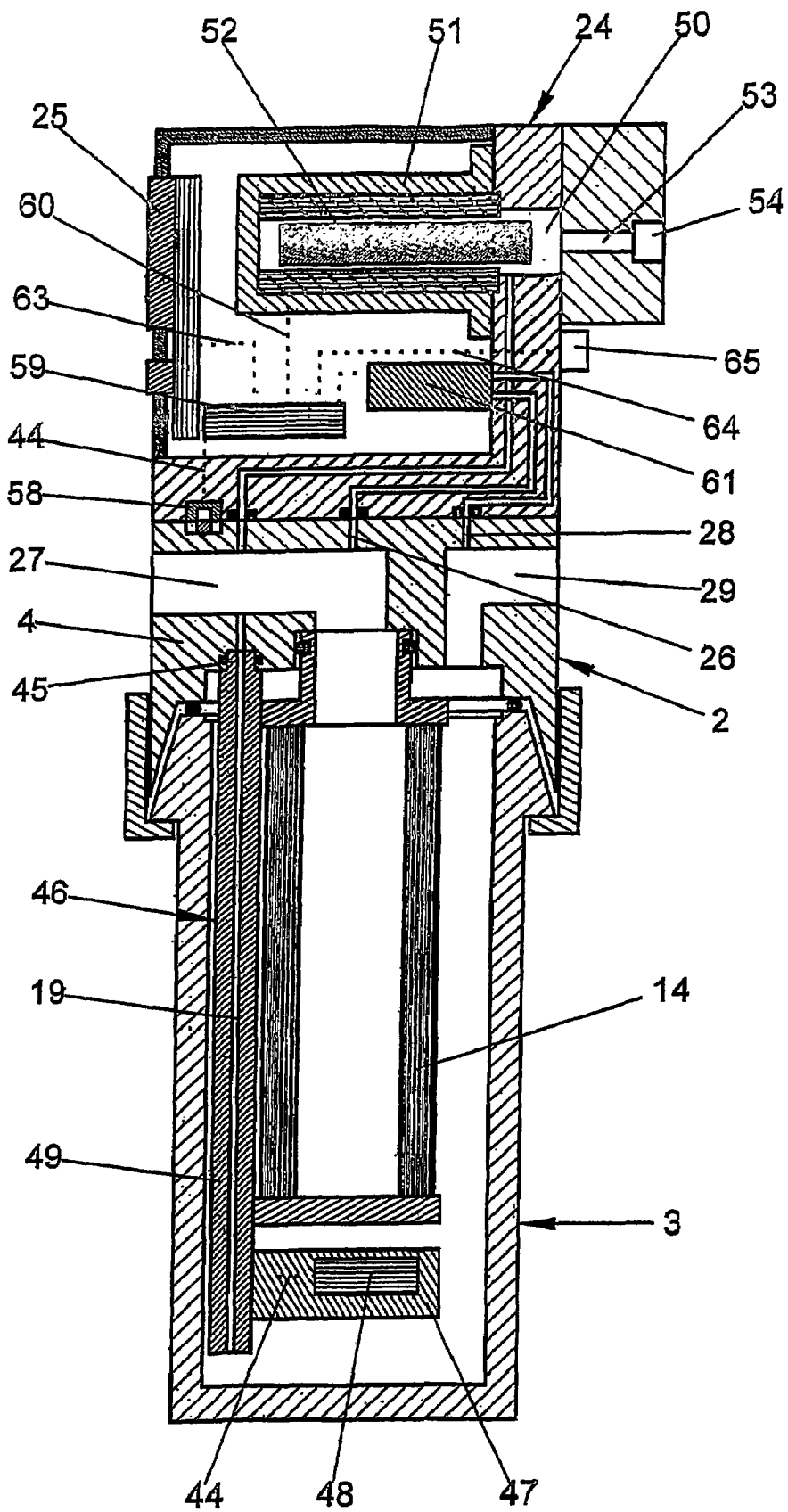

MULTI FUNCTIONAL FILTER

BACKGROUND OF THE INVENTION

The present invention relates to a multifunctional filter and claims the priority of German patent application 103 09 428.8-23, to the contents of which reference is hereby made.

Compressed-gas, in particular compressed-air, systems require filters for separating out solid and liquid foreign substances, such as dirt particles, condensate and oil, entrained in the gas stream.

Conventional compressed-air filters generally comprise a two-part housing having a top part and a bottom part, which are either screwed together or connected to one another by means of a union nut or a bayonet fitting. The housing top part usually has an inflow passage and an outflow passage on diametrically opposite sides. The inflow passage opens out either centrally into a hollow-cylindrical filter element, which is screwed or adhesively bonded into the top part, or into the annular space between the filter element and the housing. Accordingly, the outflow passage leads either out of the annular space or out of the interior of the filter element, depending on whether the gas is to flow through the filter element from the inside outward or from, the outside inward. Consequently, the direction of flow in the filter is fixed after assembly and cannot be altered in the assembled position. The direction of flow at the same also defines the field of use of the filter; since in the case of dust filtering, the gas flows through the filter element from the outside and in the case of coalescence filtering the gas flows through the filter element from the inside in order for compressed-air condensate to be separated out. Consequently, conventional filters are only suitable for use either as a dust filter or as a coalescence filter once the direction of flow has been fixed after installation in the compressed-air system.

European laid-open specification 0 808 206 has disclosed a filter which is provided with a differential pressure indicator for monitoring the filter contamination, and this differential pressure indicator is connected to the inflow passage and the outflow passage of the filter via respective measurement passages. In filters of this type, a change in function is particularly complex since it is not only the filter which then has to be rotated through 180°, but also the differential pressure indicator, in order to return its display to the visible side.

Since liquid, in particular condensate, which is separated out in the filter collects in the bottom part of the housing and the capacity of the latter is very restricted, it is also necessary for the liquid to be discharged from time to time. This is usually done automatically under level control with the aid of a condensate discharge, wherein a level sensor in a collection space for the condensate drives a solenoid valve, which for its part actuates a diaphragm valve for opening and closing a liquid outlet in the lower part of the filter housing. As described in PCT laid-open specification WO 98/45 641, the condensate discharge may be arranged below the filter housing bottom part, which functions as a collection space for the condensate, and releases the condensate downward via an outlet passage. On account of the line connections, it is likewise no longer necessary to change the function or direction of the flow after assembly in a filter having a condensate discharge of this type.

Although a change in function is not usually necessary while the filter is operating, the drawback remains that filters provided with a differential pressure indicator and/or with a condensate discharge are in each case designed for just one direction of flow; consequently, they can be used either only as coalescence filters (direction of flow from the inside outward) or as dust filters (direction of flow from the outside inward) without being converted.

SUMMERY OF THE INVENTION

Therefore, the invention is based on the problem of providing a filter which allows a function change in situ in a simple way.

The solution to this problem consists in a rotatable connection flange being arranged between the two housing parts of a filter which has a housing composed of a top part and a bottom part. This enables a function change to be implemented by simply rotating the connection flange through 180°. The rotation causes the two filter spaces, namely the interior of the filter element on the one hand and the annular space between the filter element and the housing on the other hand, to be respectively switched from one passage to the other.

Therefore, the user can decide which function he wants to use the filter for in situ or before assembly. Consequently, the top part can be provided with a front side, for example having display instruments, a viewing window or a functional block, and can therefore always require a set installation position. Nevertheless, the adaptor flange according to the invention allows the filter to be operated in both directions of flow. This simplifies stock-keeping very considerably and leads to a significant cost saving, since both directions of flow are possible with one top part.

When seen in plan view, the connection flange preferably comprises a plate with two openings and a web, with two openings which are of the same cross section or congruent arranged laterally reversed with respect to one another on either side of the web. In the operating position, the openings connect the two filter spaces (annular space/interior of the filter element) to the two passages in the housing top part. For this purpose, a passage (flange passage) leads from one of the flange openings to the interior of the filter element, and a passage (flange passage) leads from the other flange opening to the annular space between the filter element and the housing.

If the two flange openings are each surrounded by a sealing ring and are in this way sealed with respect to the housing top part, there can be no leaks between the inflow passage and the outflow passage if one or both sealing rings are defective.

To enable the condensate which collects in the housing bottom part to be discharged upward, it is preferable for an axial condensate line to extend from the housing top part through the connection flange and the filter element into the lower region of the housing bottom part. In this case, a, for example, capacitive level sensor is located in said lower region of the housing bottom part and is connected, via an electrical line following the condensate line, to the housing top part and a condensate discharge located there.

The capacitive level sensor may also be connected to a functional block via a riser line (condensate line) for discharging the condensate which collects in the lower part of the filter housing, a plug connection between the riser line and a condensate passage leading to an outlet valve and an electrical plug connection, which connects electrical lines leading from the level sensor to electronics in the functional block. The functional block may also be arranged on the housing bottom part and connected to the interior of the bottom part and to a level sensor via a passage.

The riser line can run within the annular space between a hollow-cylindrical filter element and the filter housing and may preferably be connected to a headpiece which engages around an upper end cap of the filter element. To fix the riser line and the filter element in the housing, the filter element may be provided with radial supporting ribs and the headpiece may be arranged between in each case two supporting ribs.

The level sensor arranged at the lower end of the riser line can engage beneath the filter element in the manner of a claw and can if appropriate also support the filter element. The riser line and with it also the required electrical lines for the level sensor may also be routed centrally through the filter element to the functional block.

To release condensate from to time as a function of the control by the level sensor, the functional block may include a directly controlled solenoid valve, preferably with a horizontal electromagnetic plunger. However, it is particularly advantageous to use a diaphragm valve which is driven by way of a solenoid valve and preferably has a vertical diaphragm.

Assembly and dismantling are simplified if the transmission of energy and information between the discharge adaptor and the functional unit is carried out with the aid of two coils and a ferrite core.

Finally, simple adjustment to different pipe diameters of the compressed-air system and simplified stock-keeping result if the inflow passage and the outflow passage are provided with a connection adaptor.

BRIEF DESCRIPTION OF THE DRAWING

The invention is explained in more detail below on the basis of exemplary embodiments illustrated in the drawing, in which:

FIG. 6 shows a filter with a differential pressure indicator in the functional position for coalescence filtration;

FIG. 7 shows the filter shown in FIG. 4 in the dust filtration functional position;

FIG. 10 diagrammatically depicts the inner structure of a filter with a condensate discharge and a functional block;

DETAILED DESCRIPTION OF THE PREFERRED EMBODIMENTS

Figure 1:
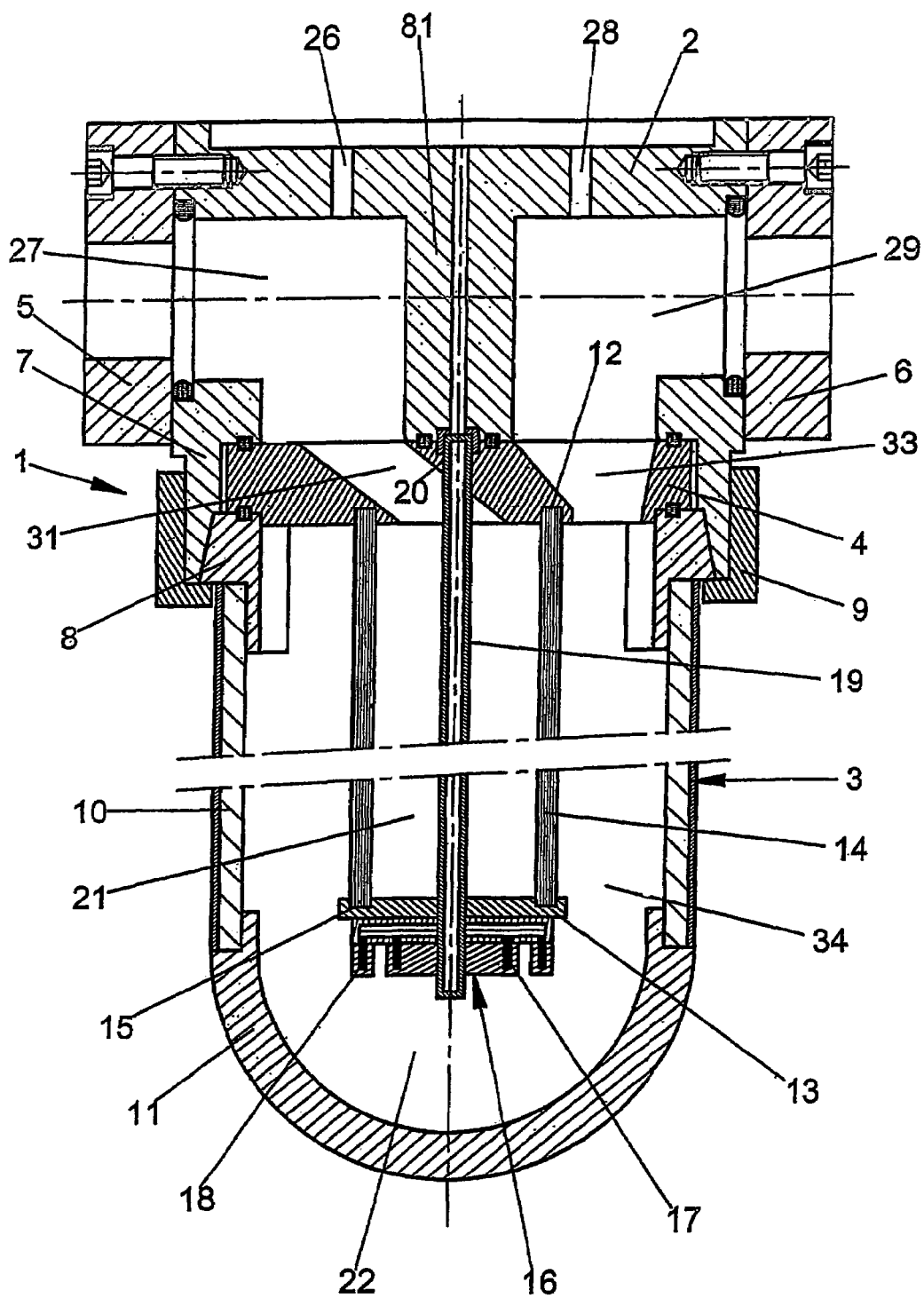
FIG. 1 diagrammatically depicts an axial longitudinal section through a filter.
Figure 2:
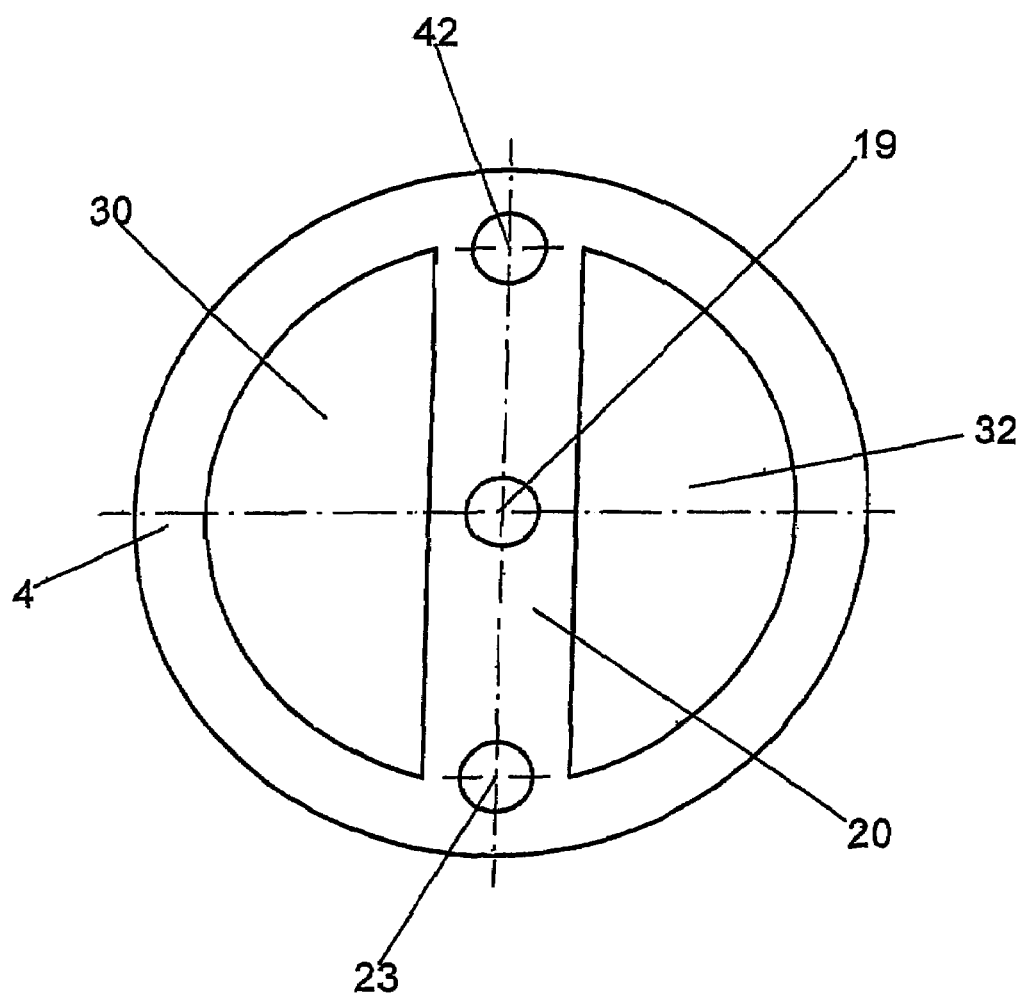
FIG. 2 diagrammatically depicts a plan view of a connection flange.
Figure 3:
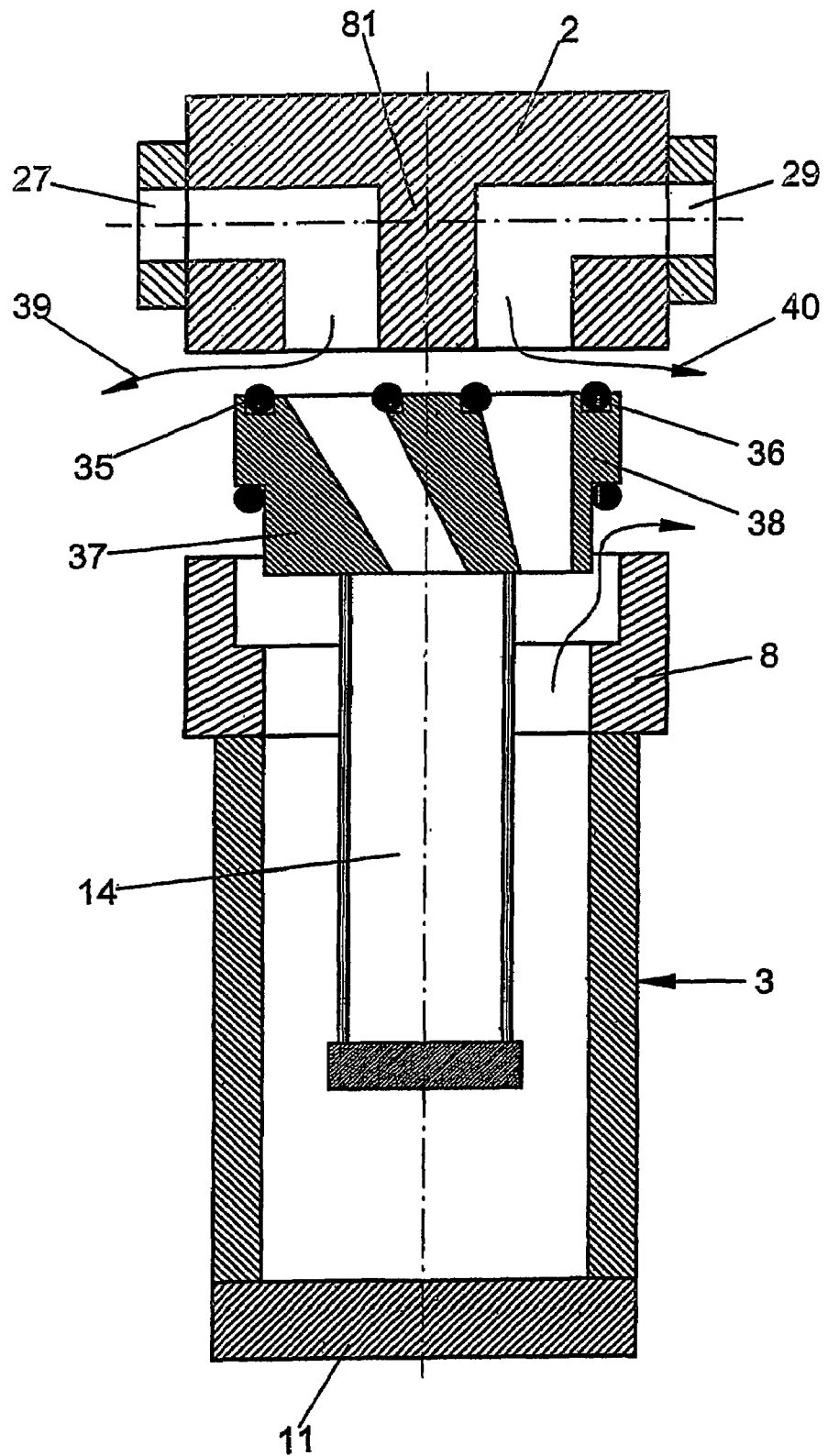
FIG. 3 diagrammatically depicts the main components of the filter.
Figure 4:
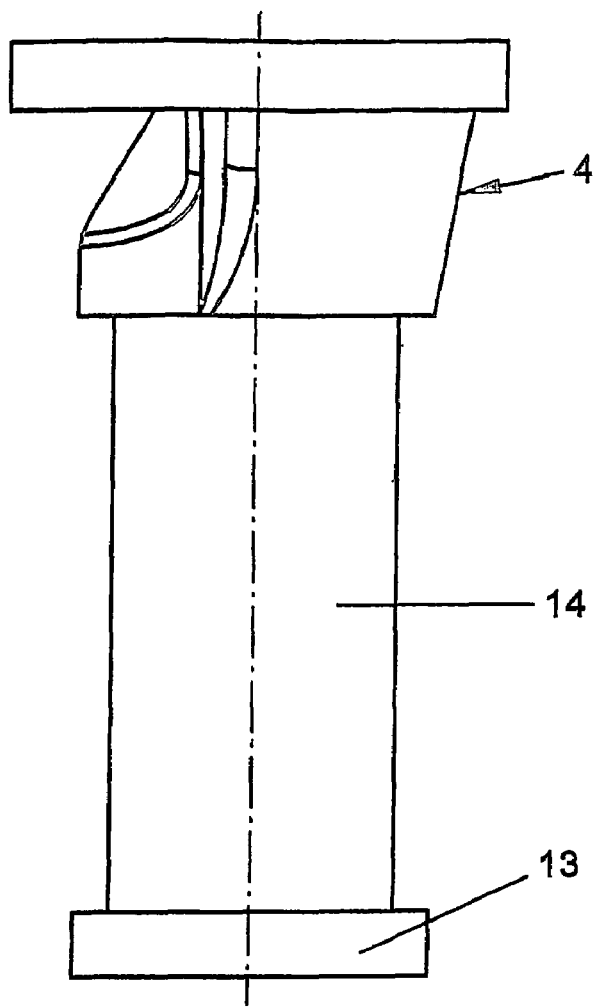
FIG. 4 shows a side view of a filter element with a connection flange as a single building block.

The filter 1 illustrated comprises a top part 2 and a bottom part 3, between which a connection flange 4 is arranged. The top part 2 has two connection adaptors 5, 6, by means of which the filter 1 can be introduced, for example, into a compressed-air line (not shown). The loosely inserted connection flange 4 is clamped between an inner collar 7 of the top part 2 and a connection ring 8 of the housing bottom part with the aid of a union nut 9. The connection ring 8 is fixedly connected to a cylindrical center piece 10 of the housing, which is adjoined by a bottom cap 11.

The upper edge of a hollow-cylindrical filter element 14, which is closed off at the bottom by a cover 13, is clamped in a sealed or adhesively bonded manner in a groove 12 in the connection flange 4. The cover 13 likewise has a peripheral groove 15, in which the lower edge of the filter element 14 is adhesively bonded or clamped. The cover 13 bears a capacitive level sensor 16 with two annular electrodes 17, 18. A condensate tube 19 extends as a riser line through a web 20 of the connection flange 4, the interior 21 of the filter element 14 and its cover 13 into the interior 22 of the housing bottom part 3. An electrical line (not shown), which is connected to a contact pin 23 in the connection flange 4, follows the condensate tube 19. The contact pin 23 engages in a contact bush (not shown) of the housing top part 2 and is electrically connected to a functional block 24 on the housing top part 2.

The functional block 24 includes a differential pressure gauge 61 having a display 25 and is connected, via a passage 26, to an inflow passage 27 for unfiltered gas and via a passage 28 to an outflow passage 29 for the fresh gas (FIG. 10). The inflow passage 27 and the outflow passage 29 are separated from one another by a partition wall 81, which may be very thin but is also suitable for holding lines or even instruments.

The inflow passage 27 opens out into the opening 30 of a flange passage 31 which connects the inflow passage 27 to the interior 21 of the filter element 14. The outflow passage 29, on the other hand, is connected to the opening 32 of a flange passage 33 which leads to the annular space 34 of the housing bottom part 3.

The passage openings 30, 32 are surrounded by sealing rings 35, 36 in grooves 37, 38. Accordingly, in the event of a defective seal, it is impossible for a leak to form between the two gas passages 27, 29. Rather, in the event of a defective sealing ring 35, the unfiltered gas passes to atmosphere, or in the case of a defective sealing ring 36 the purified gas passes to atmosphere, in accordance with the direction arrows 39, 40. In the position of the connection flange shown in FIG. 1, 3, 5, 6, the unfiltered gas flows through the inflow passage 27 and the flange passage 31 into the interior 21 of the filter element 14; the filter then serves as a coalescence filter. From there, the unfiltered gas flows through the filter layers of the filter element 14 and ultimately emerges as purified gas from the annular space 34 through the flange passage 33 and the outflow passage 39 into a purified-gas line (not shown).

If the same filter is to be used for a different function, i.e. as a dust filter, the connection flange 4, prior to installation, after slight loosening of the union nut 9, is rotated through 180° from the position shown in FIG. 1, 3, 5, 6 into the position shown in FIG. 7. Then, the union nut is tightened again and the filter is fitted. During the adjustment of the connection flange 4, the flange passage 33 is rotated to beneath the inflow passage 27 and therefore produces a connection to the annular space 34, while the opening 32 of the flange passage moves to beneath the outflow passage 29, so that the flange passage 31 produces a connection to the interior 21 of the filter element 14. In this situation, illustrated in FIG. 7, the unfiltered gas flows from the inflow passage 29 through the flange passage 33 into the annular space 34 and from the outside into the interior 21 of the filter element 14 and, from there, via the flange passage 31 to the outflow passage 27. As will be clear from a comparison of FIGS. 6 and 5, the passage 27 is the inflow passage in FIG. 6 and the outflow passage in FIG. 7, whereas the passage 29 is the outflow passage in FIG. 6 and the inflow passage in FIG. 7.

Figure 5:
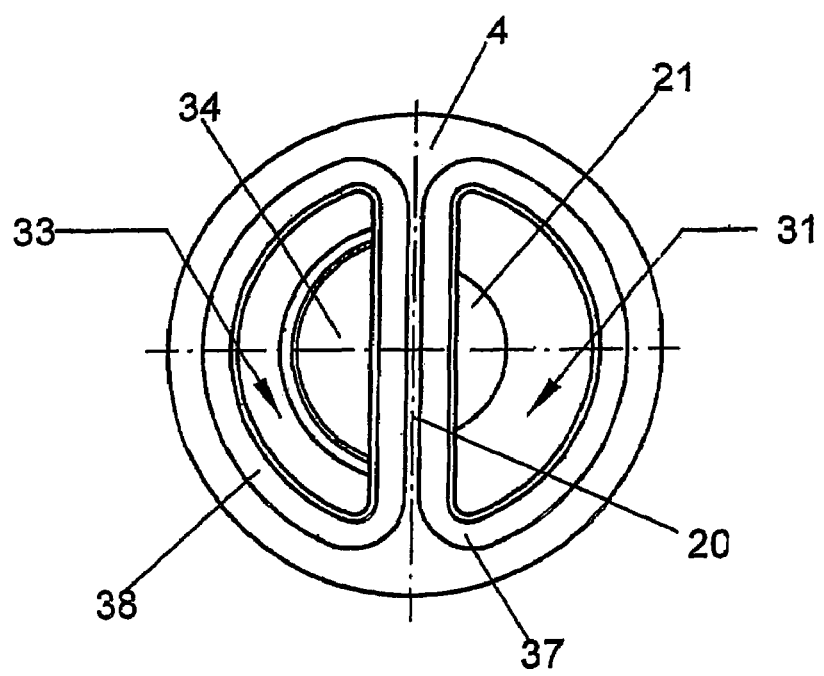
FIG. 5 shows a plan view of the connection flange of the building block shown in FIG. 4.

In the case of the filter illustrated, the change of function is possible by simply rotating the connection flange 4 through 180° with respect to the housing top part 2, since the passage openings 30, 32 and the openings of the inflow passage 27 and of the outflow passage 29 located opposite them are arranged laterally reverse with respect to one another and are formed congruently, as can be seen most clearly for the passage openings 30, 32 from FIG. 5.

To move the connection flange 4 into the correct, i.e. functionally intended, installation position during a change of filter element, a positioning pin 41 on the housing top part 2 engages in a corresponding bore 42 at the connection flange 4, as illustrated in FIG. 1, 6, 7.

The level of the condensate which collects at the bottom of the housing bottom part, over the course of time, reaches the electrodes 17, 18 and thereby closes a circuit which includes the solenoid valve of the condensate discharge located in the functional block 24, with the result that a valve of the condensate discharge (cf. FIG. 10, 11) opens and the condensate flows out via the condensate tube 19, under the influence of the system pressure prevailing in the interior 22 of the filter housing 2, 3, until the level of the condensate in the housing bottom part 3 has dropped back below the electrodes 17, 18 and the circuit has been opened again.

Figure 8:
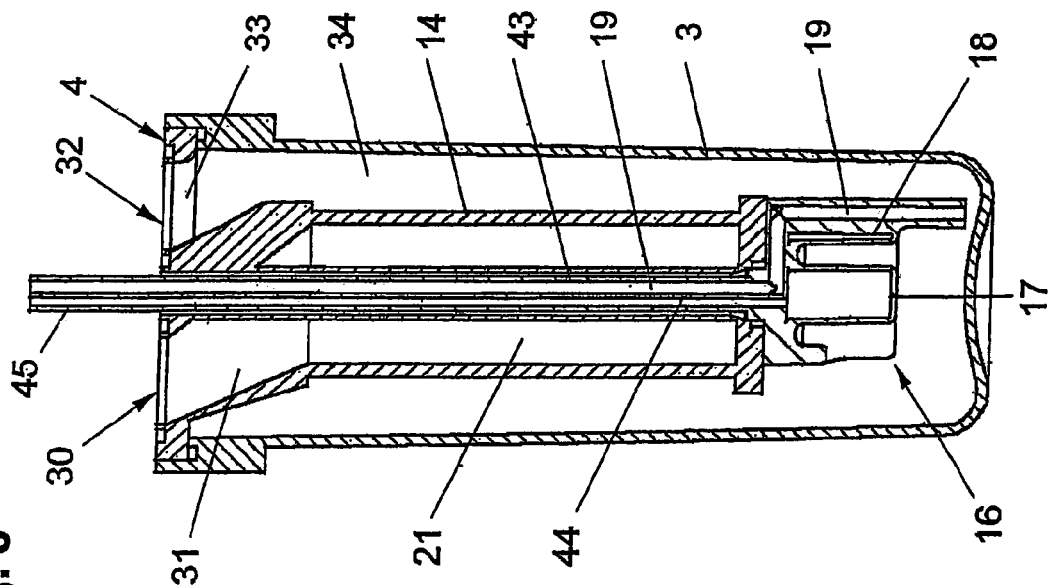
FIG. 8 shows the lower housing part of a filter for a top part with condensate discharge.

In the case of the filter which is depicted diagrammatically in FIG. 8, the connection flange 4 and the filter element 14, on the one hand, and the condensate tube 19 together with the level sensor 16, on the other hand, each form a structural unit. The condensate tube 19 is surrounded by an outer tube 43 which also accommodates the electrical lines 44 running from the electrodes 17, 18 to the functional block 24. The condensate tube 19 and the electrical lines 44 end in a plug connector 45 which engages in a bush (not shown) in the housing top part 2.

Figure 9:
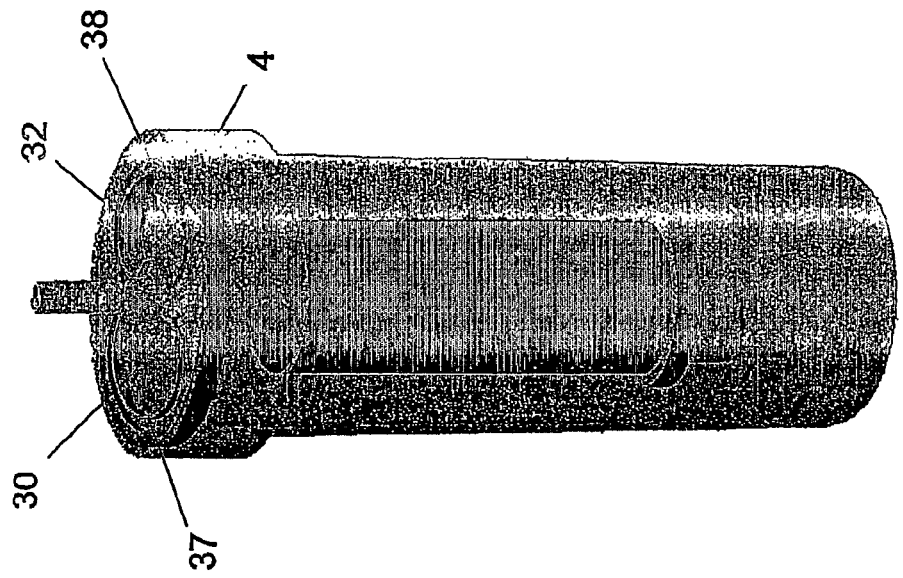
FIG. 9 shows a filter element which is integrally joined to a connection flange on one side and also to a level sensor and a condensate line.

The building block comprising connection flange 4, filter element 14, level sensor 16 and condensate tube 19 illustrated in FIG. 9 shows a perspective illustration of the two symmetrically arranged flange openings 30, 32 with the encircling grooves 37, 38 for the sealing rings 35, 36, which prevent untreated gas from passing into the fresh gas passage 29 in the event of a defective sealing ring 35.

In the exemplary embodiment illustrated in FIG. 10, a connection flange 4 is once again arranged between the housing top part 2 and the housing bottom part 3, and this connection flange at the same time produces a connection between a discharge adaptor 46 and the functional block 24. The discharge adaptor 46 comprises a level sensor 47 having a printed circuit board 48, which engages beneath the filter element 14 in the manner of a claw and is connected to a riser line 49. The riser line 49 accommodates the electrical lines 44 from the printed circuit board 48 and opens out in a plug connection 45 of the connection flange 4. The condensate passage 19 which leads from the lower part of the filter housing 2, 3 continues through the connection flange 4, the housing top part 2 and the functional block 24 into a discharge chamber 50 of the functional block 24. This discharge chamber is provided with an electromagnetic outlet valve 51, the solenoid plunger 52 of which is arranged horizontally and opens and closes the valve opening 53 of a discharge passage 54 under the control of the level sensor 47. For this purpose, the level sensor 47 or its printed circuit board 48 is connected via the lines 44 and two plug connections in the region of the connection flange 4 as well as a plug connection 58 between the housing top part 2 and the functional block 24 to a printed circuit board 59 in the functional block 24, from which an electrical line 60 leads to the solenoid valve 51.

The passages 26, 28 from the inflow passage 27 for unfiltered gas and from the outflow passage 29 for the fresh gas lead to a differential pressure gauge 61, which is likewise connected to the printed circuit board 59 via an electrical line 62. Furthermore, the printed circuit board 59 is connected via an electrical line 63 to the display 25 and via a line 64 to a plug connector 65 for the power supply.

Figure 11:
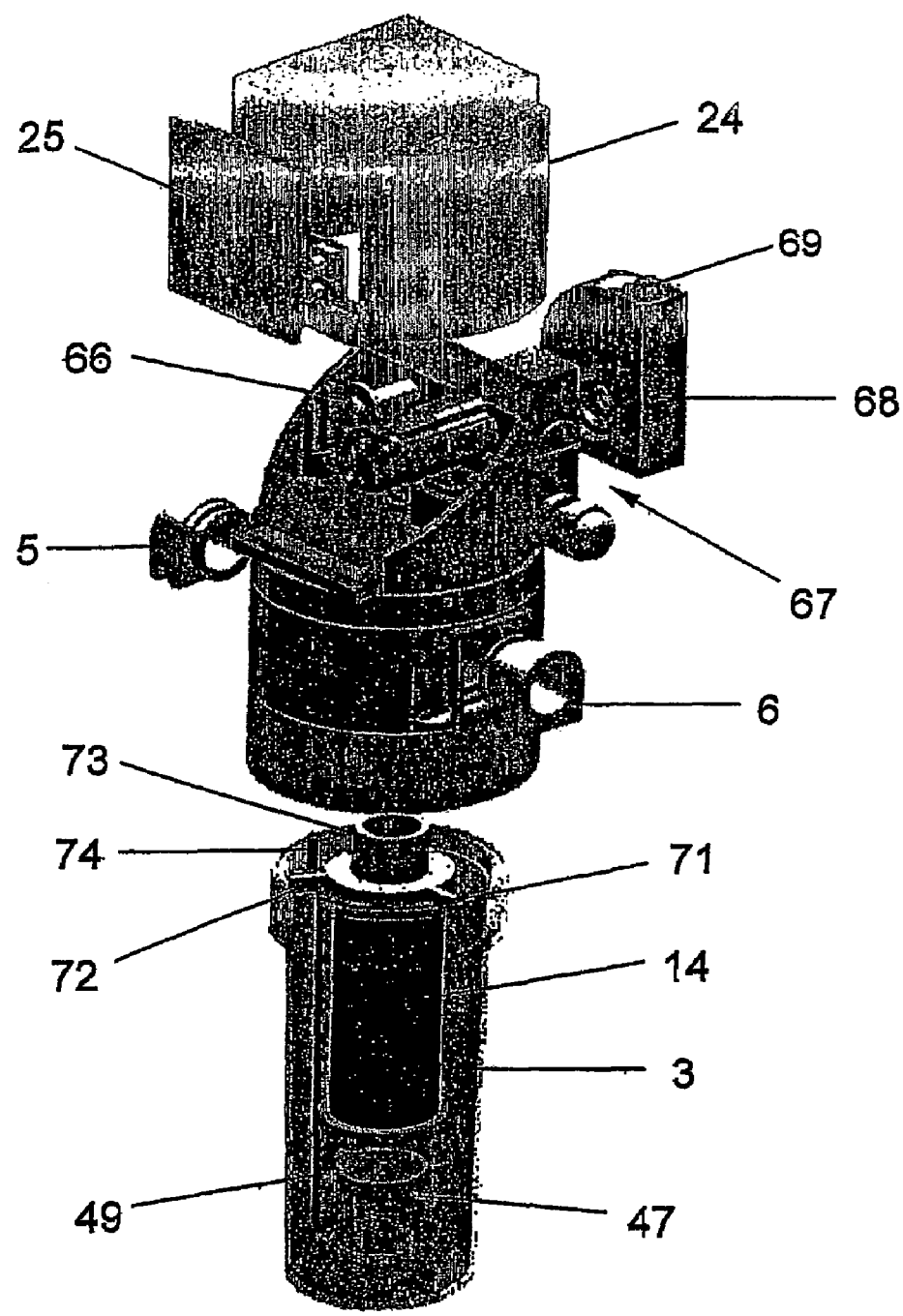
FIG. 11 shows a perspective illustration of a functional block with a diaphragm valve for discharging condensate.

As an alternative to the solenoid valve 51 which is directly controlled by the level sensor 47, it is also possible, as illustrated in FIG. 11, to use a diaphragm valve 67, which is controlled by an electromagnetic pilot control valve 66 electrically connected to the level sensor 47 and of which only the diaphragm cover 68 with a valve opening 69, which leads to a discharge passage (not shown) running transversely to the valve opening 53, is illustrated in FIG. 11. The diaphragm cover 68 accommodates the diaphragm, the control chamber of which is connected to the discharge passage 53 via a bypass line (not shown). This control line is opened and closed by the electromagnetic pilot control valve 66 as a function of the signals from the level sensor 47. When the control line opens, the control chamber is vented, so that the diaphragm lifts off from the valve opening 69 and the condensate which has collected in the lower part of the filter housing 3 can flow out via the riser line 49 under the influence of the compressed air which is acting therein until the level of the condensate has dropped sufficiently far for the level sensor 47 to emit a corresponding signal to the pilot control valve.

Connection adaptors 5, 6 which are adapted to nominal widths of the compressed-air lines are screwed or plugged into the inflow and outflow passages 28, 29.

Figure 12:
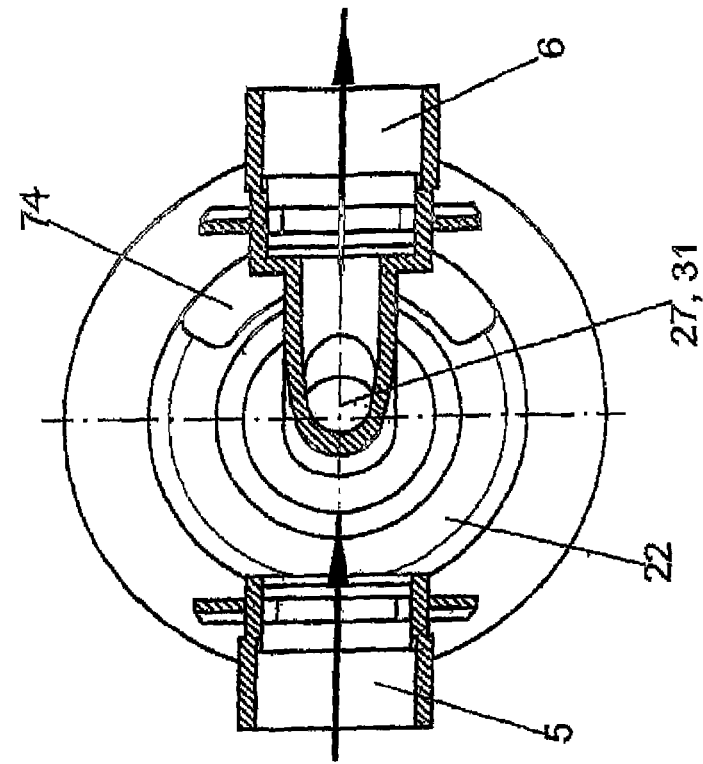
FIG. 12 shows a section on line XI-XI in FIG. 12.
Figure 13:
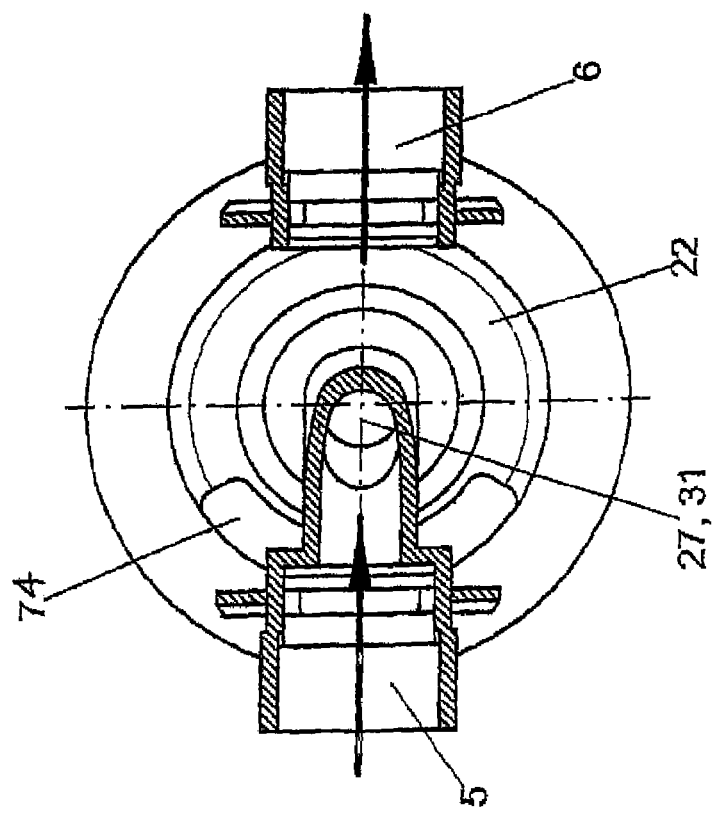
FIG. 13 shows a section through the housing top part in the plane of the center axes of the inlet and outlet.

FIG. 12 shows a sectional illustration, in part also in plan view, of the housing top part 2 with the filter element 14, its annular space 22 and the inflow passage 27 with the connection adaptor 5. This figure clearly reveals how the inflow passage 27 opens out directly into the interior 21 of the filter element 14 via the flange passage 31. Rotating the connection flange 4 with the flange passage 21 into the position illustrated in FIG. 13 changes the function, since the connection adaptor 6 is then connected to the unfiltered air line and the connection adaptor 5 or the passages 27, 31 are connected to the purified air line, and the compressed air also flows through into the filter element from the outside inward.

Furthermore, the filter element illustrated in FIG. 11, 12, 13 is provided with the radial supporting ribs 71, 72, 73 which center the filter element in the housing and between them accommodate a headpiece 74 at the upper end of the discharge adaptor 46.

What is claimed is:

1. A filter comprising:
   a housing having a top part and a bottom part, said bottom part having a connection ring;
   a filter element received in the bottom part;
   a rotatable connection flange arranged between the bottom part and the top part of the housing,
   a sealing ring disposed between the connection flange and the connection ring.

2. The filter as claimed in claim 1, wherein the connection flange, when seen in plan view, comprises a plate with two openings and a web.

3. The filter as claimed in claim 1, wherein the connection flange is clamped between the top part of the housing and the connection ring.

4. The filter as claimed in claim 1, wherein the connection flange is connected rotatably to the top part of the housing and in a manner fixed against rotation to the filter element.

5. The filter as claimed in claim 1, wherein the filter element is provided with the connection flange.

6. The filter as claimed in claim 1, wherein the filter element is connected to the connection flange.

7. The filter as claimed in claim 1, wherein the bottom part of the housing comprises a cylindrical center part, a connection ring secured to an upper end of the center part, and a bottom cap secured to a lower end of the center part.

8. The filter as claimed in claim 1, wherein the connection flange is clamped between the top part and the bottom part of the housing.

9. The filter as claimed in claim 1, wherein the connection flange forms a unitary structure with the filter element.

10. A filter, comprising:
a housing having a top part and a bottom part;
a filter element received in the bottom part; and
a rotatable connection flange arranged between the bottom art and the top part of the housing, said connection flange provided with two congruent openings arranged as mirror images with respect to one another, wherein one of the openings is connected to an interior of the filter element by a first passageway, and the other one of the openings is connected to an annular space between the filter element and the bottom part of the housing by a second passageway.

11. The filter as claimed in claim 10, wherein the connection flange has a web, with the openings arranged as mirror images on either side of the web and having a segment-shaped configuration.

12. A filter, comprising:
a housing having a top part and a bottom part;
a filter element received in the bottom part; and
a rotatable connection flange arranged between the bottom part and the top part of the housing, said connection flange provided with two congruent openings arranged as mirror images with respect to one another, wherein the top part of the housing is provided with complementary openings and with an inflow passage and an outflow passage.

13. The filter as claimed in claim 12, wherein the inflow passage and the outflow passage are provided with connection adaptors.

14. The filter as claimed in claim 12, further comprising a partition wall extending between the inflow passage and the outflow passage.

15. The filter as claimed in claim 12, wherein the inflow and outflow passages run in an L shape or in the shape of an arc.

16. A filter, comprising:
a housing having a top part and a bottom part;
a filter element received in the bottom part; and
a rotatable connection flange arranged between the bottom part and the top part of the housing, said connection flange provided with two congruent openings arranged as mirror images with respect to one another, wherein the openings in the connection flange are each surrounded by a sealing ring.

17. A filter, comprising:
a housing having a top part and a bottom part;
a filter element received in the bottom part;
a rotatable connection flange arranged between the bottom part and the top part of the housing; and
an axial condensate line extending from the top part of the housing through the connection flange and having a condensate tube projecting through the filter element.

18. A filter, comprising:
a housing having a top part and a bottom part;
a filter element received in the bottom part;
a rotatable connection flange arranged between the bottom part and the top part of the housing; and
a level sensor arranged below a free end of the filter element.

19. A filter, comprising:
a housing having a top part and a bottom part;
a filter element received in the bottom part; and
a rotatable connection flange arranged between the bottom part and the top part of the housing,
wherein the top part of the housing is provided with a positioning pin to engage a positioning opening of the connection flange.

20. A filter, comprising:
a housing having a top part and a bottom part;
a filter element received in the bottom part; and
a rotatable connection flange arranged between the bottom part and the top part of the housing,
wherein the top part and the bottom part of the housing are connected to a functional block having a differential pressure indicator and a condensate discharge.

21. The filter as claimed in claim 20, further comprising a level sensor connected to the functional block via a discharge adaptor having a riser line connected to the lever sensor, a plug connection intended for condensate and disposed at an end of the riser line, and an electrical plug connection disposed between the top part of the housing and the functional block.

22. The filter as claimed in claim 21, wherein the discharge adaptor runs between the filter element and the bottom part of the housing.

23. The filter as claimed in claim 21, wherein the discharge adaptor engages around the filter element by means of a headpiece.

24. The filter as claimed in claim 23, wherein the filter element is provided with radial supporting ribs, the headpiece being arranged between two of the supporting ribs.

25. The filter as claimed in claim 21, wherein the level sensor engages beneath the filter element in the manner of a claw.

26. The filter as claimed in claim 21, further comprising a cover for closing off a lower end of the filter element, the cover and the level sensor forming a unitary structure.

27. The filter as claimed in claim 21, wherein a central riser line is routed through the filter element to the functional block.

28. The filter as claimed in claim 21, further comprising a solenoid valve arranged in the functional block and directly controlled by the level sensor, said solenoid valve having a horizontal solenoid plunger.

29. The filter as claimed in claim 21, wherein the functional block is provided with a diaphragm valve which has a vertical diaphragm and is subject to pilot control via an electromagnetic valve.

30. The filter as claimed in claim 21, further comprising a contactless transmission system for transmitting energy and information between the discharge adaptor and the functional unit, the transmission system having two coils and a ferrite core.

31. A filter element, comprising a connection flange having first and second passages and attached to a top part of a filter housing for rotation between a first position in which the first passage connects an interior of the filter element with an inflow passage of the top part and the second passage connects an annular space of the filter housing with an outflow passage of the top part, and a second position in which the first passage connects the annular space of the filter housing with the outflow passage of the top part and the second passage connects the interior of the filter element with the inflow passage of the top part.

32. The filter element of claim 31 forming a unitary structure with the connection flange.

33. The filter element of claim 31, wherein the connection flange, when seen in plan view, comprises a plate with two openings and a web.

34. The filter element of claim 31, wherein the connection flange is provided with two congruent openings arranged as mirror images with respect to one another.

35. The filter element of claim 34, wherein the connection flange has a web, with the openings arranged as mirror images on either side of the web and having a segment-shaped configuration.

36. The filter element of claim 34, wherein the openings in the connection flange are each surrounded by a sealing ring.

* * * * *